United States Patent
Taira et al.

[11] Patent Number: 5,930,806
[45] Date of Patent: Jul. 27, 1999

[54] METHOD AND SYSTEM FOR DATA MIGRATION FROM NETWORK DATABASE TO RELATIONAL DATABASE

[75] Inventors: Kazuki Taira; Jyunichi Kamakura; Takashi Hosoya; Hiroshi Suzuki; Tadahiro Haraguchi; Yoshinobu Sasakawa; Hisayuki Enbutsu, all of Kawasaki, Japan

[73] Assignee: Fujitsu Limited, Kawasaki, Japan

[21] Appl. No.: 08/985,080

[22] Filed: Dec. 4, 1997

[30] Foreign Application Priority Data

May 7, 1997 [JP] Japan ................................ 9-116727

[51] Int. Cl.[6] .................................................. G06F 17/30
[52] U.S. Cl. ........................................... 707/204; 707/205
[58] Field of Search ................................... 707/204, 205, 707/2, 200, 201

[56] References Cited

U.S. PATENT DOCUMENTS

| | | | |
|---|---|---|---|
| 5,276,867 | 1/1994 | Kenley et al. | 707/204 |
| 5,475,834 | 12/1995 | Anglin et al. | 707/203 |
| 5,537,585 | 7/1996 | Blickenstaff et al. | 707/204 |
| 5,564,037 | 10/1996 | Lam | 707/204 |
| 5,642,505 | 6/1997 | Fushimi | 707/204 |
| 5,644,766 | 7/1997 | Coy et al. | 707/204 |
| 5,664,187 | 9/1997 | Burkes et al. | 707/205 |
| 5,809,511 | 9/1998 | Peake | 707/204 |
| 5,832,522 | 11/1998 | Blickenstaff et al. | 707/204 |

Primary Examiner—Thomas G. Black
Assistant Examiner—Sanjiv Shah
Attorney, Agent, or Firm—Staas & Halsey

[57] ABSTRACT

A data migration system that enables a database system to migrate from a network data model to a relational data model in a short development time, without degradation in data integrity. A record migration unit creates target records for the relational data model. The records are arranged in the same way as they originally were in the network data model before data migration has been made. A primary key addition unit then adds a primary key to each of the target records so that they can be uniquely identified. To preserve the original parent-child relationships between records, a relation key addition unit selects each child record from among the target records, identifies the parent of the child record by referring to the pointers added to corresponding source records, and gives a value of the primary key of the parent record to the child record as a relation key thereof. Further, a set sequence key addition unit gives set sequence keys to the child records so that they will represent a sequential order of the source records.

6 Claims, 6 Drawing Sheets

METHOD AND SYSTEM FOR DATA MIGRATION FROM NETWORK DATABASE TO RELATIONAL DATABASE

BACKGROUND OF THE INVENTION

1. Field of the Invention

The present invention relates to a method and system for data migration between different database systems and to a computer-readable medium encoded with a program designed for such data migration. More particularly, the present invention relates to a method and system for data migration from a database constructed with a network data model to another database constructed with a relational data model, as well as to a computer-readable medium encoded with a program that causes a computer to execute such a data migration process.

2. Description of the Related Art

The database technology plays a key role in today's integrated information systems. Modern database designs can be distinctively categorized in terms of the data model used to organize individual records, e.g., network model and relational model. Historically, network data models have long been used as the basis for many commercial systems. However, many of today's system developments are based on the relational data model because of its advantages over the past models, including comprehensible data structure, high data independence, and non-procedural data manipulations. While there still exist a number of applications working on the basis of the network data model, it is not easy to maintain those systems because they need a thorough knowledge of how the data is actually linked to each other in the network structure. In reality, the number of engineers who can support those systems are decreasing, and this fact causes users' concerns about the operations and maintenance of their database systems. In such situations, many legacy systems based on the network data model are now required to migrate to new relational database systems.

In the network data model, the relations between records are represented by pointers under the control of a database management system (DBMS). As opposed to this, data in the relational data model is organized in the form of simple data tables, where the data items, or records, in each table have no hierarchical relationships with one another.

The information about pointers in the network data model is affixed to each record as "set information" that shows its hierarchical relationships with other records. However, this set information cannot be added as is to the records of the relational model because it is not directly specified by the users in an explicit manner, and the relational data model does not allow, by definition, any hierarchical relationships between records. Although it would be possible to transfer individual records to a new database environment, their record-to-record connections cannot directly be transported from network data model to relational data model. Therefore, when trying to migrate database systems from network model to relational model, it is necessary to analyze the structure of the existing data and make an appropriate modification to make the data suitable for the new database design.

However, the changes in the data structure will affect the total processing mechanisms implemented in application programs (hereafter "applications") to manipulate the data. While it is easily understood that the existing applications would not operate unless they are properly modified, what the migration from network model to relational model entails is not a partial modification, but extensive work for adaptation to the new data structure. Eventually, one has to discard the existing applications and develop other applications to provide the same functions on the new database designs. As such, the data migration is not a simple data conversion, but rather a redesign of total database systems from scratch, requiring a long development time, a large amount of work, and considerable labor costs.

SUMMARY OF THE INVENTION

Taking the above into consideration, an object of the present invention is to provide a data migration system that enables a database system to migrate from network data model to relational data model in a short development time, without degradation in data quality.

Another object of the present invention is to provide a computer program that enables a database system to migrate from network data model to relational data model in a short development time, without degradation in data quality.

Still another object of the present invention is to provide a data migration method that enables a database system to migrate from network data model to relational data model in a short development time, without degradation in data quality.

To accomplish the first object, according to the present invention, there is provided a data migration system for migrating a database from a network data model, where records are interrelated by pointers, to a relational data model. This data migration system comprises a record migration unit, a primary key addition unit, a relation key addition unit, and a set sequence key addition unit. The record migration unit creates target records for the relational data model which are arranged in the same way that source records are originally arranged in the network data model. The primary key addition unit adds a primary key to each of the target records so as to uniquely identify the target records. The relation key addition unit selects each child record from among the target records, and identifies a parent record of the child record by referring to the pointers added to the corresponding source records. The relation key addition unit then gives a value of the primary key of the parent record to the child record as its relation key. The set sequence key addition unit defines set sequence keys of the child records so that they will represent a sequential order of the source records.

To accomplish the second object, according to the present invention, there is provided a computer-readable medium encoded with a computer program for migrating a database from a network data model, where records are interrelated by pointers, to a relational data model. This computer program is designed to run on a computer in order to cause the computer to function as: (a) a record migration unit which creates target records for the relational data model which are arranged in the same way that source records are originally arranged in the network data model; (b) a primary key addition unit which adds a primary key to each of the target records so as to uniquely identify the target records; (c) a relation key addition unit which selects each child record from among the target records, identifies a parent record of the child record by referring to the pointers added to the source records, and gives a value of the primary key of the parent record to the child record as a relation key thereof; and (d) a set sequence key addition unit which gives set sequence keys to the child records so that the set sequence keys will represent a sequential order of the source records.

To accomplish the third object, according to the present invention, there is provided a method of migrating a database from a network data model, where records are interrelated by pointers, to a relational data model. This method comprises the steps of: (a) creating target records for the relational data model which are arranged in the same way that source records are originally arranged in the network data model; (b) adding a primary key to each of the target records so as to uniquely identify the target records; (c) for each child record selected from among the target records, identifying a parent record of the child record by referring to the pointers added to the source records, and giving a value of the primary key of the identified parent record to the child record as a relation key thereof; and (d) giving set sequence keys to the child records so that the set sequence keys will represent a sequential order of the source records.

The above and other objects, features and advantages of the present invention will become apparent from the following description when taken in conjunction with the accompanying drawings which illustrate [a] preferred embodiments of the present invention by way of example.

DESCRIPTION OF THE PREFERRED EMBODIMENTS

The concept and embodiment of the present invention will be described below with reference to the accompanying drawings.

Figure 1:
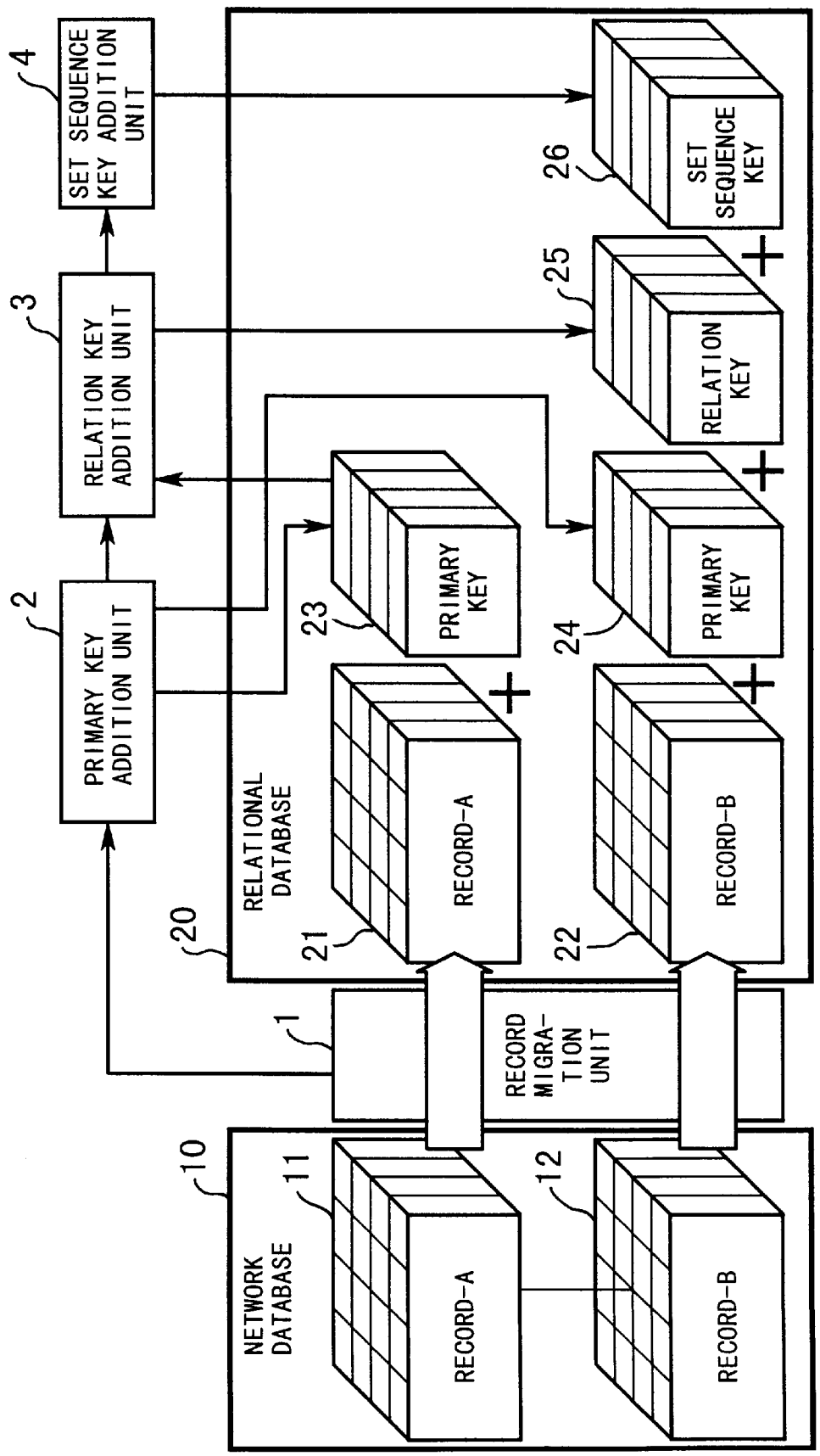
FIG. 1 is a conceptual view of the present invention.

FIG. 1 is a conceptual view of the present invention, where a data migration system converts data from a network database 10 to a relational database 20. The network database 10 contains a class of source records (i.e., legacy data items before migration) 11 of a record type "RECORD-A" and another class of source records 12 of a record type "RECORD-B." There exists a parent-child relationship between those two classes of source records, or two record sets 11 and 12. That is, "RECORD-A" is the parent of "RECORD-B."

The data migration system comprises a record migration unit 1, a primary key addition unit 2, a relation key addition unit 3, and a set sequence key addition unit 4. The record migration unit 1 creates target record sets 21 and 22 in the relational database 20, where records are arranged in the same way as the source record sets 11 and 12 in the network database 10. The primary key addition unit 2 adds primary keys 23 and 24 to each record contained in the target record sets 21 and 22. Here, the term "primary key" means a key that unambiguously identifies a record.

In the present invention, the parent-child hierarchy between the source record sets 11 and 12 will be transported to the target system and represented in a different way in the relational database 20. More specifically, several additional key items are added to the target record set 22, so that the records will inherit the nature of child records from the source record set 12 being positioned below the record set 11 in the hierarchy. To this end, the relation key addition unit 3 examines the pointers affixed to the source record sets 11 and 12 to investigate which record pairs have a parent-child relationship. According to the result of this investigation, the relation key addition unit 3 adds a first additional key item to each record in the target record set 22 by giving the values of the primary keys 23 of the relevant parent records. This first additional key item is referred to as relation keys 25.

Further, the set sequence key addition unit 4 gives a second additional key item, set sequence keys 26, to the target record set 22 so as to preserve the order of records included in the source record sets 11 and 12. Suppose here that a certain parent record in the network database 10 has a link to a plurality of child records. Those child records can be sequentially retrieved by tracing this link. With such a sequence of child records preserved, the proposed data migration system makes the same sequential data retrieval possible in the relational database 20 after the migration. That is, the sequence of child records relevant to a certain parent record can be determined by comparing the values of the set sequence keys 26 affixed to the record set 22.

In operation of the data migration system configured as above, the record migration unit 1 first creates the record sets 21 and 22 arranged in the same way that the source records are in the network data model. While the data migration inevitably affects the existing applications, the consistency in the record arrangement concentrates this affection within a limited area of database manipulation instructions including data definition statements. The primary key addition unit 2 then adds the primary keys 23 and 24 to both parent and child record sets 21 and 22 created in the relational database 20. To the child record set 22, the relation key addition unit 3 and set sequence key addition unit 4 further provide relation keys 25 and set sequence keys 26. The relation keys 25 are used to identify the hierarchical parent-child relationships between records, while the set sequence keys 26 ensure the sequential order of child records when a 1:n parent-child relationship is present.

The above-described database configuration enables sequential access to the migrated records in the relational database 20, by utilizing the hierarchical relationships and the sequence of child records inherited from the original network database 10. This leads to another benefit that application programs to manipulate the relational database 20 can be generated from the existing applications designed for the network database 10, without changing their internal structure. This program generation process requires no substantial change in the basic structure of applications, and only demands to translate data access instructions for the network database 10 into those for the relational database 20 on an individual statement basis. It is therefore possible to automatically create a new version of applications suitable for the relational database 20 through a simple translation process. In this way, the data migration is accomplished with a small amount of work, in a short time, and at a low development cost.

As for the keys affixed to the target records, there are several methods to determine the values of them. The primary keys 23 and 24, which have to be unique to each record, can be generated by a counter that is incremented each time the primary key addition unit 2 assigns a primary key to a record. Similarly, in order to set sequential numbers to the set sequence keys 26, the set sequence key addition unit 4 can use such a counter that is incremented each time it assigns a new set order key. Further, time stamps can serve as a source of the primary keys 23 and 24 or set sequence keys 26. The use of time stamps allows the sequence of the records to be naturally consistent with the order of key settings, as well as eliminating the counter described above. When using the time stamps to define the set sequence keys 26, the data migration system has to start it with the record at the highest level of the database hierarchy and then proceed downwards. This rule must be kept strictly in order to preserve the original sequence of child records.

The above-described data migration system will be implemented as a program executed by a computer, which converts existing data and also revises existing application packages. The next section will present a specific embodiment of the present invention, where a computer is configured as an automated data migration tool to perform the conversion of data models and revision of database applications. Those key functions of the data migration tool are implemented as a computer program supplied in a computer-readable storage medium.

Figure 2:
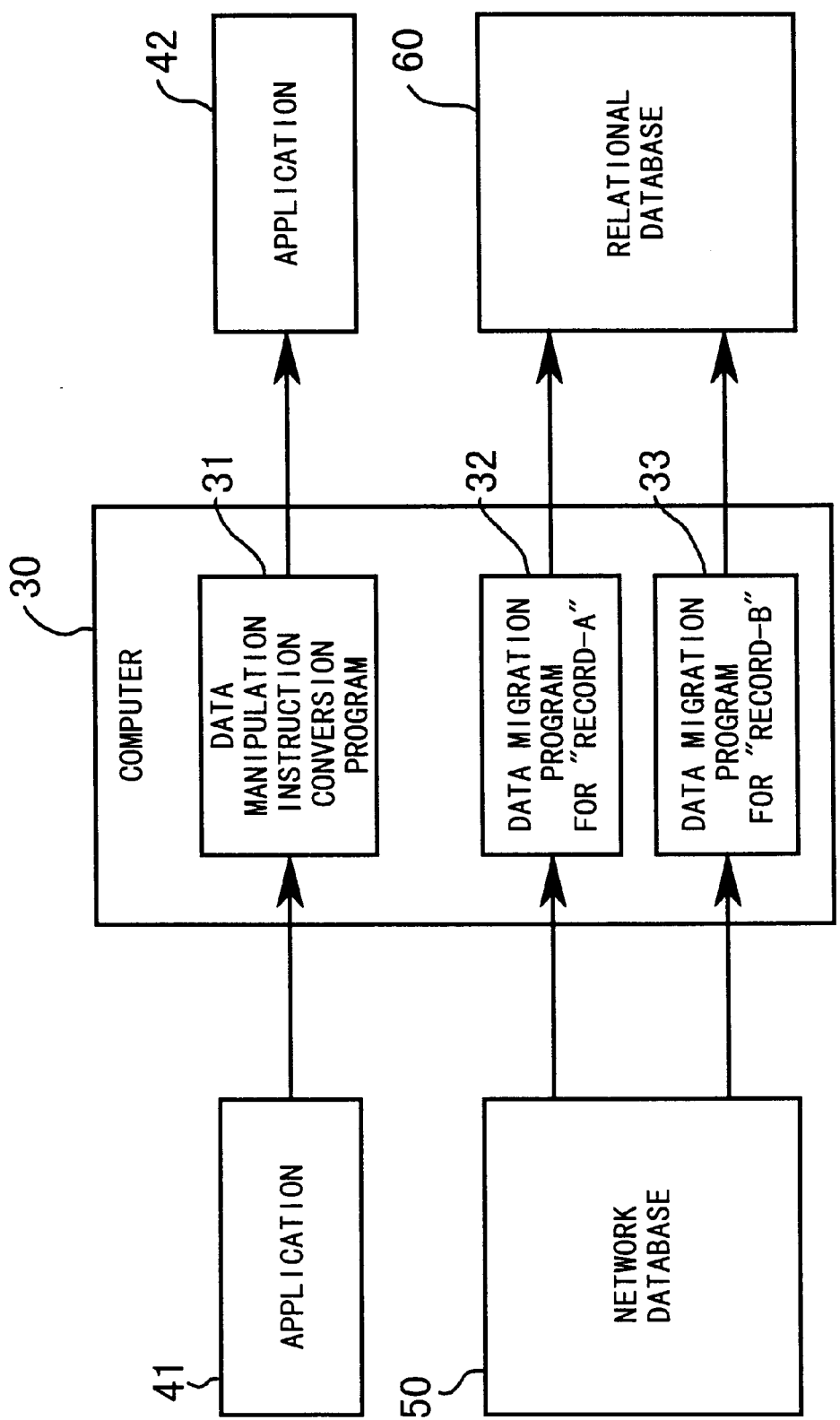
FIG. 2 is a diagram which shows an embodiment of the present invention.

FIG. 2 shows a specific embodiment of the present invention, where a computer 30 functions as a data migration system. This computer 30 comprises a tool for converting data from a network database 50 to a relational database 60. This tool is actually composed of two separate programs, a data migration program 32 for "RECORD-A" and a data migration program 33 for "RECORD-B," where the terms "RECORD-A" and "RECORD-B" represent two different classes of records. The data migration program 32 for "RECORD-A" includes computer instructions to implement the functions of the record migration unit 1 and primary key addition unit 2 explained in FIG. 1. On the other hand, the data migration program 33 for "RECORD-B" includes computer instructions to implement all functional elements shown FIG. 1, from the record migration unit 1 to the set sequence key addition unit 4. The computer 30 also comprises a data manipulation instruction conversion program 31 that converts an existing application 41 to a revised application 42 suitable for the relational database 60.

Figure 3:
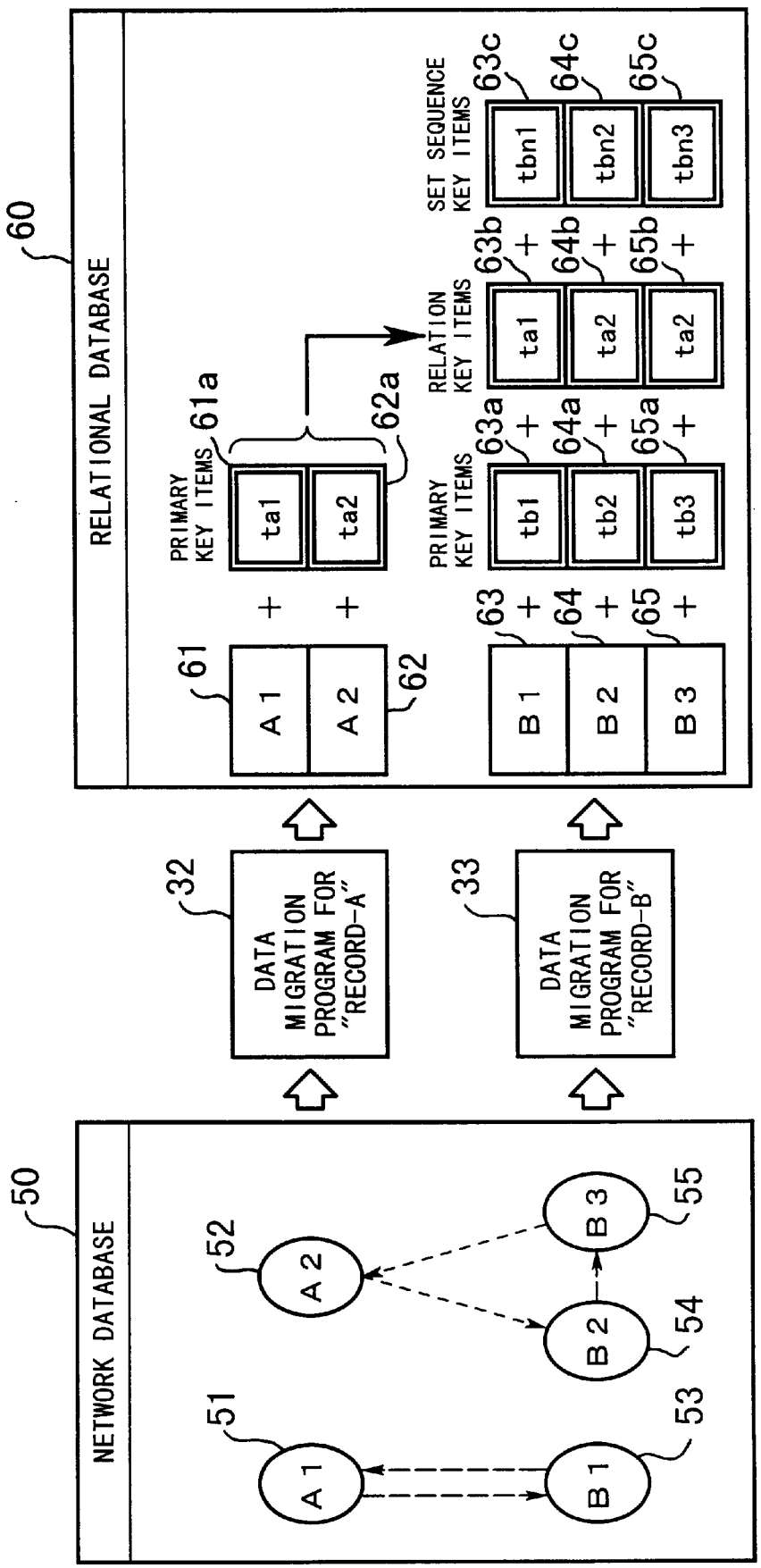
FIG. 3 is a diagram which shows how a data migration process proceeds in the present embodiment of the invention.

FIG. 3 shows how a data migration process proceeds in the present embodiment of the invention. The network database 50 contains two kinds of records 51 and 52 that belong to the class "RECORD-A," which is positioned as a parent class in the network hierarchy. Here, the records 51 and 52 are assumed to have the contents of "A1" and "A2," respectively. Just below the record 51, there is a child record 53 belonging to the class "RECORD-B." Likewise, there are two child records 54 and 55 below the record 52, both belonging to the class "RECORD-B." The contents of those three child records 53, 54, and 55 are "B1," "B2," and "B3," respectively.

The data migration program 32 for "RECORD-A" creates records 61 and 62 for the use in the relational database 60 by simply duplicating the records 51 and 52 without changing their original record arrangement. Similar to this, the data migration program 33 for "RECORD-B" creates three records 63, 64, and 65 in the relational database 60 by duplicating the records 53 to 55 without changing their original record arrangement.

The data migration program 32 for "RECORD-A" then adds primary keys 61a and 62a to the records 61 and 62 as their primary key items. Likewise, the data migration program 33 for "RECORD-B" adds primary keys 63a, 64a, and 65a to the records 63, 64, and 65. Here, different values should be assigned to those primary keys 61a, 62a, 63a, 64a, and 65a, so that the corresponding record data will be uniquely identified. In this example, the values "ta1," "ta2," "tb1," "tb2," and "tb3" are set to those primary keys.

Subsequently, the data migration program 33 for "RECORD-B" adds relation keys 63b to 65b to the child records 63 to 65, assigning the primary key values of corresponding parent records to them. Now, the record 63 has gained the relation key 63b with a value of "ta1" deriving from the primary key 61a of the parent record 61. The remaining two records 64 and 65 are below the parent record 62, and therefore, their respective relation keys 64b and 65b now have the same value "ta2" deriving from the primary key 62a of their common parent record 62. It should be noted here that the data migration program 33 for "RECORD-B" recognizes such interrelationships of records by referring to the pointers added to each record in the network database 50. In FIG. 3, the pointers are represented by arrows between records.

Lastly, the data migration program 33 for "RECORD-B" adds set sequence keys 63c, 64c, and 65c to the child records 63, 64, and 65, so that the original order of records in the network database 50 will be inherited properly. To preserve the record order defined in the network database 50, the data migration program 33 for "RECORD-B" follows a connection path from each parent record 51 or 52 to its child records, being guided by the pointer information. Each time a child record is found, it adds a new number to the record in a sequential fashion. It is assumed in the present example that time stamps are used to determine the set sequence keys 63c, 64c, and 65c. At first, the record 63 gains a value "tbn1" as its set sequence key 63c. According to the sequential order indicated by the pointers, the record 64 gains a value "tbn2" as its set sequence key 64c, and then the record 65 gains a value "tbn3" as its set sequence key 65c. When the pointer of the present child record points to its parent record, the data migration program 33 for "RECORD-B" recognizes the present child record as the final one. In this way, the data is constructed in the relational database 60.

After all data has been transferred to the relational data model, the system then revises the applications so that they adapt to the new environment. Although the existing applications actually involves various operations, the changes will be applied only to data manipulation instructions. The following paragraphs will present an example of an application and describe how the application makes access to the data, specifically in a database search operation as well as in a database update operation.

Figure 4:
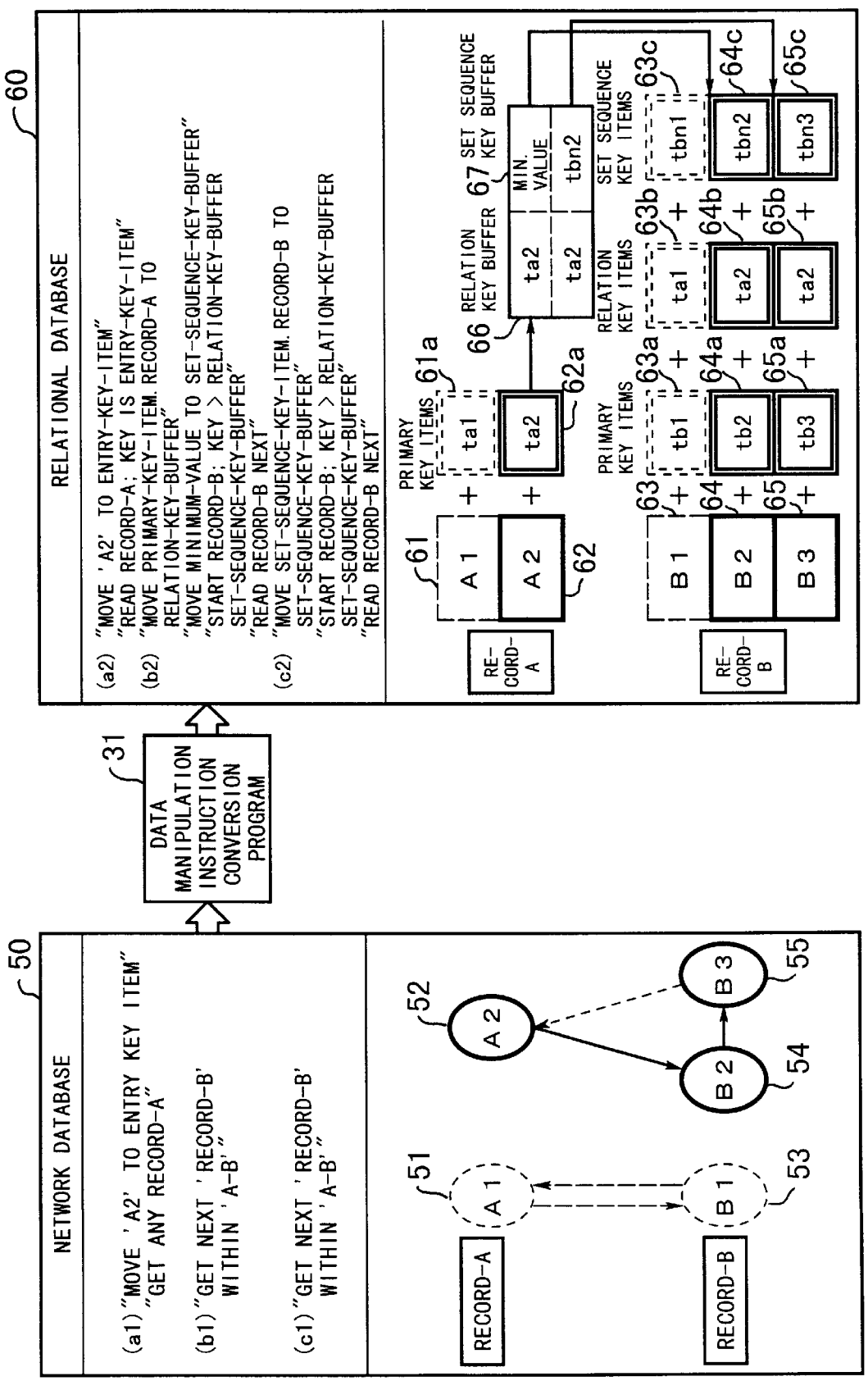
FIG. 4 is a diagram which shows how the system makes access to data when retrieving a particular record from a database.

FIG. 4 shows how the system makes access to data when retrieving a particular record from the database. More specifically, the left half of FIG. 4 shows an example of a record search operation in the network database 50, while the right half shows an example of the same operation in the relational database 60.

Suppose that the existing application contains the following three steps of data manipulation:

(a1) "MOVE 'A2' TO ENTRY-KEY-ITEM" "GET ANY RECORD-A"

(b1) "GET NEXT 'RECORD-B' WITHIN 'A–B'"

(c1) "GET NEXT 'RECORD-B' WITHIN 'A–B'"

The first step (a1) performs a direct retrieval of a record in the class "RECORD-A" that is specified by a particular entry key item. This example shows that a value "A2" was entered to the variable "ENTRY-KEY-ITEM," and a record 52 having a value of "A2" has been retrieved from among the records in the class "RECORD-A." The second step (b1) carries out a sequential retrieval of child records. Out of the class "RECORD-B" records, the database system retrieves a child record below the parent record 52 that has been found in step (a1). In the present example, the step (b1) yields the record 54. The third step (c1) continues the sequential data retrieval in the same way as in step (b1), thereby obtaining the record 55 with a value "B3."

The data manipulation instruction conversion program 31 rewrites the above instructions as follows:

(a2) "MOVE 'A2' TO ENTRY-KEY-ITEM" "READ RECORD-A; KEY IS ENTRY-KEY-ITEM"

(b2) "MOVE PRIMARY-KEY-ITEM.RECORD-A TO RELATION-KEY BUFFER" "MOVE MINIMUM-VALUE TO SET-SEQUENCE-KEY-BUFFER" "START RECORD-B; KEY>RELATION-KEY-BUFFER SET-SEQUENCE-KEY-BUFFER" "READ RECORD-B NEXT"

(c2) "MOVE SET-SEQUENCE-KEY-ITEM.RECORD-B TO SET-SEQUENCE-KEY-BUFFER" "START RECORD-B; KEY>RELATION-KEY-BUFFER SET-SEQUENCE-KEY-BUFFER" "READ RECORD-B NEXT"

The first step (a2), containing two relational database control instructions which have been converted from those of step (a1), searches for a particular record in the class "RECORD-A." Since the original arrangement of records are kept intact in the migrated database, it is possible to make a direct data retrieval by using the existing mechanism to set key information necessary for the retrieval. In this example, the step (a2) reaches the record 62 having a value of "A2."

The second step (b2), containing four control instructions which have been converted from that of step (b1) for use in the relational database 60, makes a search for a record in the class "RECORD-B." The instructions in step (b2) use two data areas, a relation key buffer 66 and a set sequence key buffer 67, for storing search key items. These areas are allocated in a work space of the application program for "RECORD-B" data retrieval.

By executing the first instruction of step (b2), the value "ta2" of the primary key 62a added to the record 62, which has been retrieved in step (a2), is set to the relation key buffer 66. The second instruction then gives a lower limit (MINIMUM-VALUE), which is typically zero, to the set sequence key buffer 67. The third line locates a record having the smallest set sequence key among such records that are categorized in the class "RECORD-B" and have an exact relation key value "ta2." In the present example, the record 64 is located since its set sequence key 64c exhibits the smallest value. The fourth instruction in step (b2) retrieves the record 64 at the specified location.

The third step (c2), containing three relational database control instructions which have been converted from that of step (c1), also makes a search for a record in the class "RECORD-B." With the first instruction, the value of the set sequence key 64c of the record 64 retrieved in step (b2) is set to the set sequence key buffer 67. Here, the relation key buffer 66 remains unchanged. The second and third instructions of step (c2) work in the same manner as the third and fourth instructions of step (b2). More specifically, the second instruction locates the record 65 having a set sequence key value "tbn3" that is next to the value "tbn2" held in the set sequence key buffer 67, and the third instruction reads out the record 65.

Figure 5:
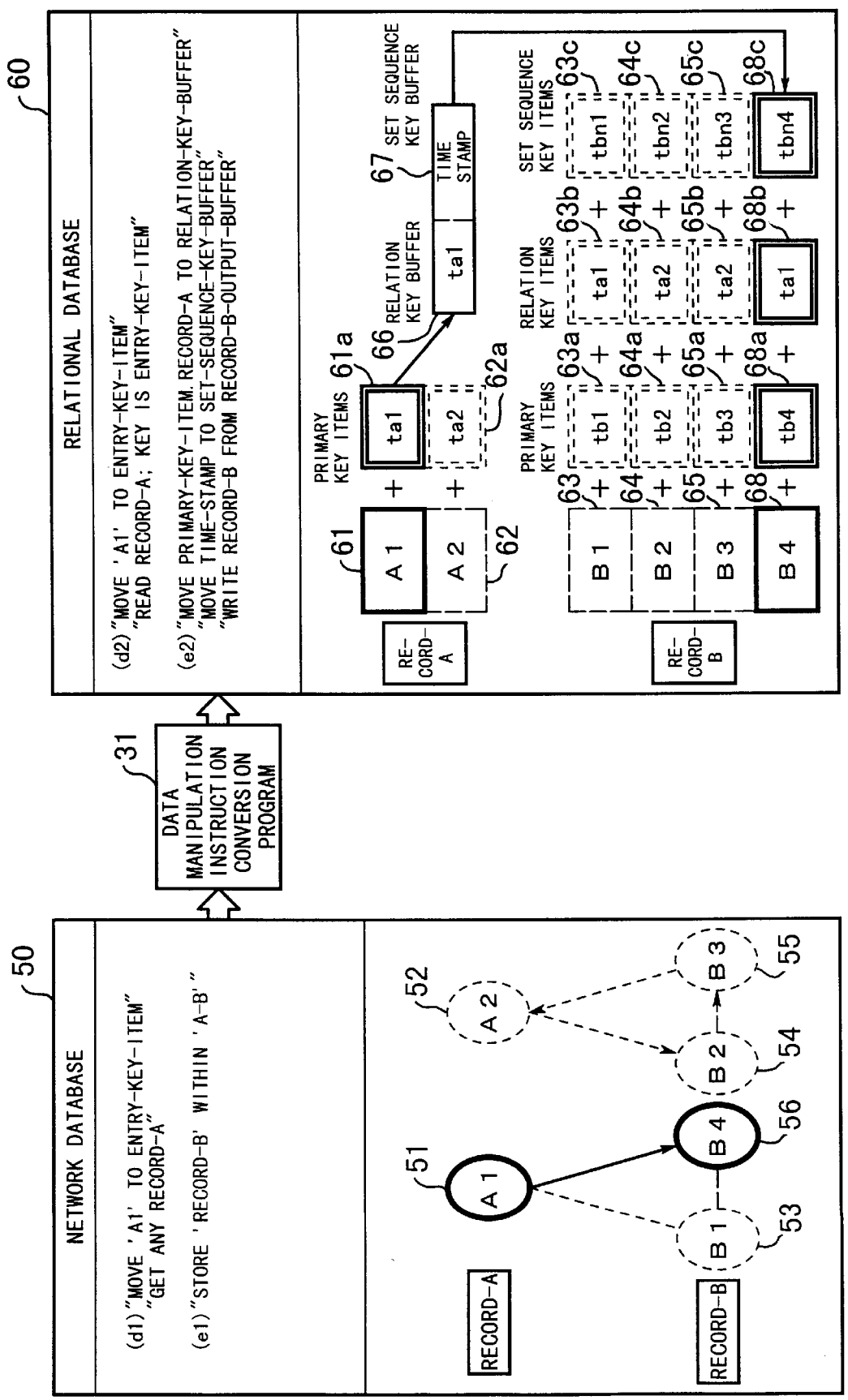
FIG. 5 is a diagram which shows how the system makes access to data when updating a record in a database.

FIG. 5 shows how the system makes access to data when updating records in the database. The left half of FIG. 5 depicts an example of a record updating operation in the network database 50, while the right half shows the same in the relational database 60. Suppose here that an existing application contains the following two steps of statements for data manipulation:

(d1) "MOVE 'A1' TO ENTRY-KEY-ITEM" "GET ANY RECORD-A"

(e1) "STORE 'RECORD-B' WITHIN 'A–B'"

The first step (d1) performs a direct retrieval of a record out of the class "RECORD-A" that is specified by a particular entry key item. That is, the system first identifies the parent record by making a direct search, before adding a new child record. The second step (e1) updates the class "RECORD-B" by inserting a new child record. More specifically, this instruction stores a new record 56 having a value of "B4" as a child record below the parent record 51 having a value of "A1."

The data manipulation instruction conversion program 31 rewrites the above instructions as follows.

(d2) "MOVE 'A1' TO ENTRY-KEY-ITEM" "READ RECORD-A; KEY IS ENTRY-KEY-ITEM"

(e2) "MOVE PRIMARY-KEY-ITEM.RECORD-A TO RELATION-KEY-BUFFER" "MOVE TIME-STAMP TO SET-SEQUENCE-KEY-BUFFER" "WRITE RECORD-B FROM RECORD-B-OUTPUT-BUFFER"

Here, the instructions in the first step (d2) execute the same process as that of step (a2) in database search operations (see FIG. 4). The second step (e2), containing three relational database control instructions which have been converted from that of step (e1), updates the class "RECORD-B" by adding a new child record. In the first instruction of step (e2) sets the primary key value of the parent record retrieved in step (d2) to the relation key buffer 66. The second instruction sets a time stamp "tbn4" to the set sequence key buffer 67. The third instruction inserts the record stored in the record-B output buffer (not shown) as a new entity of the class "RECORD-B." This new entity is referred to as a record 68, which is accompanied by a primary key 68a, a relation key 68b, and a set sequence key 68c. The value in the relation key buffer 66 is set to the relation key 68b, while the time stamp in the set sequence key buffer 67 is set to the set sequence key 68c.

The operation of this data migration system will now be described below with reference to more specific example data.

Figure 6:
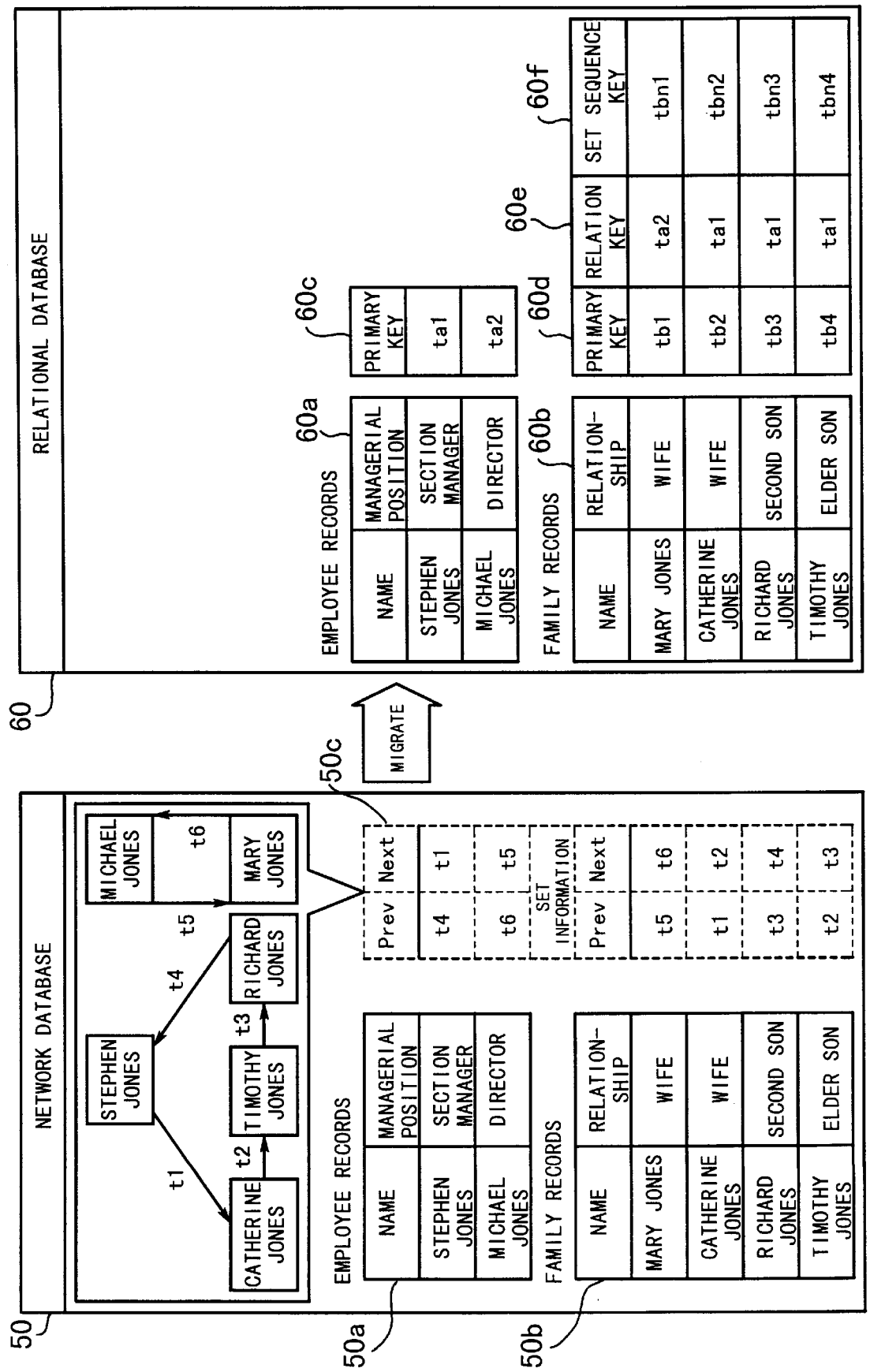
FIG. 6 is a diagram which shows an example of data structure of an original network database and a relational database that has been migrated therefrom.

FIG. 6 shows an example of data structure of an original network database and a relational database that has been migrated therefrom. The network database 50 contains employee records 50a and family records 50b. The employee records 50a consist of "Name" and "Managerial position" fields, while the family records 50b consist of "Name" and "Relationship" fields. Those records are associated with one another as indicated by pointers t1 to t6, and set information 50c is added to each record to represent such record-to-record associations. Each piece of the set information 50c consists of two pointers, i.e., "Prev" and "Next" pointers. The "Prev (previous)" pointer indicates a record immediately before the present record. On the other hand, the "Next" pointer points to a record coming next to the present record. Note that this set information 50c is not what the users supply in an explicit manner.

As this example of FIG. 6 shows, an employee "Stephen Jones" has his family consisting of his wife "Catherine Jones" and two children named "Timothy Jones" (elder son) and "Richard Jones" (second son). Another person "Michael Jones" has his wife "Mary Jones."

In the relational database 60, the employee records 60a and the family records 60b are duplicated in the same format, as a result of data migration. Although the set information 50c has not been transferred directly to the relational database 60, the relationships between records are preserved by affixing primary keys 60c to the employee records 60a, and adding primary keys 60d, relation keys 60e, and set sequence keys 60f to the family records 60b.

The above-described data migration process allows a plurality of record types (e.g., employee records and family records) to be migrated on an individual basis, thus making the migration task easy. This also permits the data migration programs to be organized as standard processes.

The data migration system of the present invention makes it possible to reuse the existing applications based on the network data model, by rewriting each individual data manipulation instruction so that it will suit the relational data model. Since the changes are required only in data manipulation instructions, one can easily create a program to automate the conversion of existing applications. Also, because of its simplicity, one can rewrite data manipulation instructions by hand with an ordinary text editor, instead of using special conversion tools.

The above discussion will be summarized below. According to the present invention, the data migration system is configured to have a function to duplicate records without changing their original arrangement, as well as a function to add primary keys, relation keys, and set sequence keys to the duplicated records. Therefore, the records keep the same format as before, and the parent-child relationships between records and the sequential order of child records are preserved even in the relational data model. This consistency in data contents allows the existing database applications to be reused with some partial modifications. Thus, the present invention provides a data migration path from network data model to relational data model at low costs, in a short development time, and with a high quality.

Further, the present invention provides a computer-readable medium encoded with a computer program for data migration. This allows a computer-based implementation of the above data migration system.

Furthermore, the present invention provides a data migration method which duplicates records without changing the arrangement of records and adds primary keys, relation keys, and set sequence keys to those duplicated records, thus allowing easy migration for each record type. The records keep the same format as before, and the parent-child inter-relationships of records are preserved even after their migration to the relational data model, as is the sequential order of child records. This consistency in the data contents permits the existing database applications to be reused by making some partial modifications.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data migration system for migrating a database from a network data model, where records are interrelated by pointers, to a relational data model, comprising:

record migration means for creating target records for the relational data model which are arranged in the same way that source records are originally arranged in the network data model;

primary key addition means for adding a primary key to each of the target records so as to uniquely identify the target records;

relation key addition means for selecting each child record from among the target records, identifying a parent record of the child record by referring to the pointers added to the source records, and giving a value of the primary key of the parent record to the child record as a relation key thereof; and set sequence key addition means for giving set sequence keys to the child records so that the set sequence keys will represent a sequential order of the source records.

2. The data migration system according to claim 1, wherein said set sequence key addition means uses a code that represents a date and time when said set sequence key addition means has added the set sequence key, as the value of the set sequence key.

3. The data migration system according to claim 1, further comprising data manipulation instruction converting means for converting a data manipulation instruction in an application program designed for the network data model into an instruction to manipulate the target records by using the primary keys, the relation keys, and the set sequence keys added thereto.

4. The data migration system according to claim 3, wherein said data manipulation instruction converting means converts a sequential retrieval instruction in the application program that searches for a particular child record in a sequential manner into an instruction that performs a sequential retrieval of the particular child record by referring to the set sequence keys of the child records whose relation keys coincide with the primary key of the parent record of the particular child record.

5. A computer-readable medium encoded with a computer program for migrating a database from a network data model, where records are interrelated by pointers, to a relational data model, the computer program being designed to run on a computer in order to cause the computer to function as:

record migration means for creating target records for the relational data model which are arranged in the same way that source records are originally arranged in the network data model;

primary key addition means for adding a primary key to each of the target records so as to uniquely identify the target records;

relation key addition means for selecting each child record from among the target records, identifying a parent record of the child record by referring to the pointers added to the source records, and giving a value of the primary key of the parent record to the child record as a relation key thereof; and set sequence key addition means for giving set sequence keys to the child records so that the set sequence keys will represent a sequential order of the source records.

6. A method of migrating a database from a network data model, where records are interrelated by pointers, to a relational data model, comprising the steps of:

creating target records for the relational data model which are arranged in the same way that source records are originally arranged in the network data model;

adding a primary key to each of the target records so as to uniquely identify the target records;

for each child record selected from among the target records, identifying a parent record of the child record by referring to the pointers added to the source records, and giving a value of the primary key of the identified parent record to the child record as a relation key thereof; and giving set sequence keys to the child records so that the set sequence keys will represent a sequential order of the source records.

* * * * *